United States Patent [19]

Minami

[11] Patent Number: 5,687,780
[45] Date of Patent: Nov. 18, 1997

[54] METHOD OF FEEDING CATALYST AND APPARATUS FOR THE SAME

[75] Inventor: Yoshitaka Minami, Himeji, Japan

[73] Assignee: Idemitsu Engineering Co., Ltd, Tokyo, Japan

[21] Appl. No.: 554,449

[22] Filed: Nov. 7, 1995

[30] Foreign Application Priority Data

Feb. 14, 1995 [JP] Japan .................. HEI 7-25541

[51] Int. Cl.⁶ .................................................. B01J 4/00
[52] U.S. Cl. .......................... 141/286; 141/1; 141/263; 141/284; 141/392; 414/301; 239/666; 239/684; 222/410; 422/219
[58] Field of Search .................. 141/1, 98, 286, 141/392, 255, 256, 263, 284; 414/300, 301; 239/665, 666, 681, 682, 684; 222/410; 422/219

[56] References Cited

U.S. PATENT DOCUMENTS

| | | | |
|---|---|---|---|
| 2,766,782 | 10/1956 | Bell et al. | 141/263 |
| 3,738,464 | 6/1973 | Ortip et al. | 141/284 X |
| 4,433,707 | 2/1984 | Farnham | 141/1 |
| 4,972,884 | 11/1990 | Souers et al. | 141/1 |
| 5,244,129 | 9/1993 | Poussin et al. | 222/410 |

FOREIGN PATENT DOCUMENTS 58-17026  2/1983  Japan ................ 414/301

OTHER PUBLICATIONS

English language abstract of Japanese Laid-Open Appln. No. 61-18430, dated Jan. 27, 1986 (1 page).

*Primary Examiner*—J. Casimer Jacyna
*Attorney, Agent, or Firm*—Flynn, Thiel, Boutell & Tanis, P.C.

[57] ABSTRACT

A rotation driving system drives unitedly and rotatably sprinkle rotors, which the disk sprinkle rotors having plural partitive members extending in predetermined distances in a radial direction to the rotating axis are arranged in multi-stage state with a predetermined distance in a longitudinal direction. In the aforementioned state, by supplying the catalyst to the center of the sprinkle rotor, the catalyst is fed into a reaction tank while releasing in a radial direction of the sprinkle rotor. When the catalyst is fed, a rotation frequency of the sprinkle rotor is defined to be a speed constituent in a radial direction of over zero when the catalyst settles down and to be periodically changed between a maximum rotation frequency and a minimum rotation frequency. And further, a diameter of each sprinkle rotor being defined as measure to cause a position where the catalyst, released from the lower sprinkle rotor rotating in the maximum rotation frequency Nmax, settles down and a position where the catalyst, released from the upper sprinkle rotor rotating in the minimum rotation frequency Nmin, settles down to be nearly equal to one another. Therefore, the catalyst is fed in a uniformly scattering state by rolling in the radial direction after settling down and the position where the catalyst settles down in the radial direction is periodically changed, whereby the catalyst can be uniformly fed in the radial direction.

19 Claims, 14 Drawing Sheets

F I G. 9 (A)
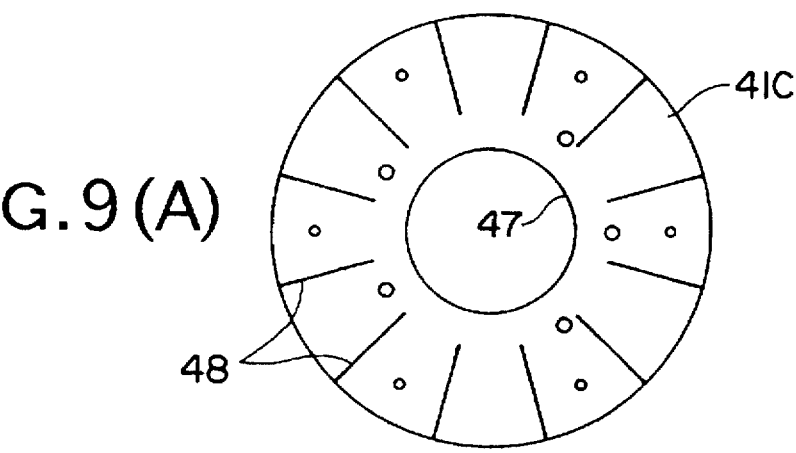
F I G. 9 (B)
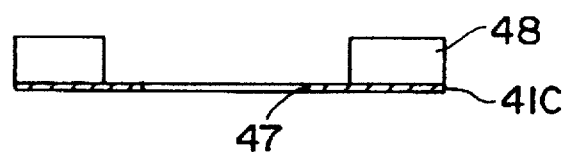
F I G. 10 (A)
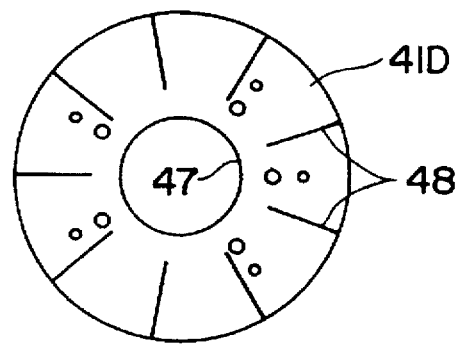
F I G. 10 (B)
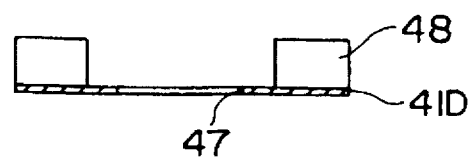

F I G. 11(A) 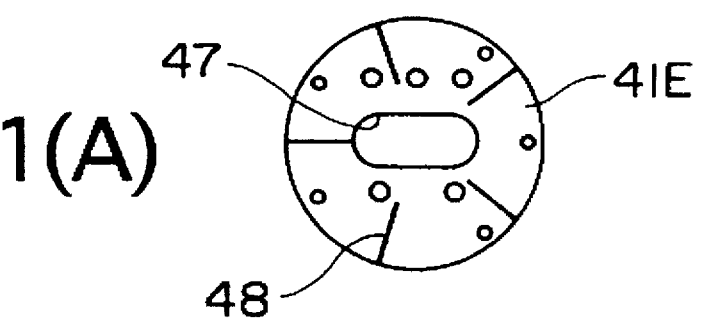
F I G. 11(B) 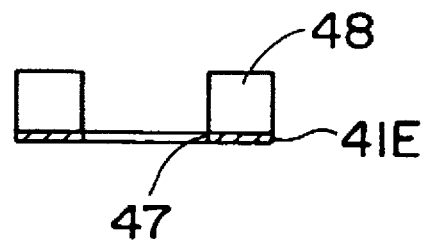

METHOD OF FEEDING CATALYST AND APPARATUS FOR THE SAME

BACKGROUND OF THE INVENTION

1. Field of the Invention

This invention relates to a method of feeding a catalyst and an apparatus for feeding a catalyst, it is expected to be used when a particle catalyst is fed inside a reaction tank employed in a petrochemical plant and so on.

2. Description of the Related Art

For a reaction tank employed in a petrochemical plant and so on, a catalyst is used for being suitably fed in response to the need for accelerating the reaction of a reactive liquid. The catalyst, which is made into particles state in order to effect fine contact with the reactive liquid, is uniformly fed at a predetermined density inside the reaction tank.

Conventionally, the catalyst feed has been carried out in a manner by putting a hose supplying the catalyst from the external hopper into the reaction tank through an opening provided at the top of the reaction tank, with a worker conveniently sprinkling the catalyst by operating the hose in the tank in order to keep the fed surface level.

However, the above conventional manner involved disadvantages such as inefficiency because of work carried out by hand inside the tank and inequalities of the feeding density of the catalyst trodden hard by the worker.

In order to overcome the above disadvantages, a method of feeding by means of a catalyst releasing device using a rotatable sprinkle type is developed by the applicant of the present invention (see Japanese Patent Application Publication No. Hei 1-22807).

In the above method, the catalyst releasing device, which rotatably sprinkles with the catalyst from the rotatable bottom releasing plate, is provided in a hung state from the opening provided at the top of the reaction tank, and the hanging height of the catalyst releasing device, the rotating speed of the releasing plate or the like is suitably controlled in order to sprinkle the catalyst in multiple concentric circles from the center to the outskirts in the reaction tank, thereby the method is intended to secure a suitable uniform sprinkle density and a smooth surface.

The feeding density of the catalyst is determined by (catalyst feeding quantity/feed volume. "Densest Feed", in which the catalyst is laterally aligned in the reaction tank so as to get the largest density, and "Sock Feed", in which the catalyst substance is intertwined with one another in the reaction tank so as to get a rough density, are used as the feeding condition.

The aforesaid condition is defined by suitably selecting from a value of the density and, for example, a type of the reaction tank for feeding or the property of reacting liquid.

Incidentally, in the aforesaid catalyst feed using the rotatable sprinkle, the required feeding density has not always been obtained due to insufficient analysis effected by rolling the catalyst that is settled down during the sprinkle process. There have been disadvantages whereby it has been difficult to achieve a level sedimentary catalyst surface.

It is an object of the present invention to provide the catalyst feeding apparatus and the catalyst feeding method capable of creating a level catalyst feed, when the catalyst is sprinkled inside the reaction tank by means of the catalyst releasing device of a pendant type.

SUMMARY OF THE INVENTION

The catalyst feeding method of the present invention is designed by noting that the catalyst is fed in much the same posture, when the catalyst settled down within the reaction tank stops after rolling in a radial direction in the reaction tank, and that the catalyst is more uniformly fed in a radial direction by periodically changing the rotation frequency of the catalyst feeding device during feeding.

More specifically, since the catalyst, fed by the conventional catalyst feeding apparatus, has been carried out from a relative high position defined away from the fed surface or the bottom of the reaction tank, the catalyst has settled down to the fed surface in free fall, or in a vertical motion as a result of a speed constituent effected to zero in the radial direction after the catalyst that is released in a radial direction of the reaction tank from the catalyst feeding apparatus flies in a radial direction to some degree. Therefore, the posture of all the catalyst that has settled down has not always pointed in the same direction, namely, it has been difficult to feed a level catalyst fed surface, and the catalyst fed surface has tended to be uneven.

However, in the method according to the present invention, since the catalyst has the speed constituent in a radial direction of the reaction tank Ux ($Ux>0$) when settling down to the fed surface, the catalyst rolls in a radial direction in the reaction tank, and then aligns after settling down so as to make the feed possible for effecting the level fed surface.

$Ux>0$ means that the catalyst, released from the catalyst releasing device, settles down to the fed surface before being in a state of free fall, thus, the desirable height released with the catalyst is at a lower position than the conventional method, more concretely, over 0.5 m from the surface of the catalyst already fed, although the decision has differences depending on the rotating speed of the catalyst releasing device or the diameter of the reaction tank.

And, in the method according to the present invention, the rotation frequency is required to be periodically changed so as to uniformly feed in a radius direction of the reaction tank.

More concretely, the aforesaid method of the present invention is the catalyst feeding method, in which the catalyst is fed inside the reaction tank by being sprinkled from the catalyst releasing device while a sprinkle rotor in the catalyst releasing device that is hung inside the reaction tank is rotated, and further it is peculiarized by defining the height from the fed catalyst surface to the catalyst releasing device in the reaction tank and the rotation frequency of the catalyst device, in which the rotation frequency of the catalyst releasing device has cause to be periodically changed, in order that the catalyst that is settled down becomes $Ux>0$ if the speed constituent in a radial direction of the reaction tank is defined as Ux when the catalyst is released from the catalyst releasing device.

In the method of the present invention, a desirable releasing initial speed of the catalyst is over 1.5 m/sec. A satisfactory roll of the catalyst cannot be obtained in less than 1.5 m/sec. And, it is preferable that a maximum rotation frequency Nmax of the catalyst releasing device is defined as a smaller value than the catalyst released from the catalyst device that directly bumps against the side wall of the reaction tank over the predetermined speed. Because, the rotation frequency over Nmax is liable to cause the catalyst to be harmed by bumping against the side wall of the reaction tank.

Furthermore, it is preferable that the catalyst releasing device used in the method of the present invention is of a multistage rotor type. The multistage type is liable to feed, thus forming a plan in the reaction tank in a short time.

The catalyst feeding apparatus of the present invention includes plural disk sprinkle rotors, each having plural partitive members which extend in a predetermined distance from one another in a radial direction to the axis of rotation, to orient the multistage disk in a predetermined distance from one another in a vertical direction, and has the catalyst releasing device, including a rotation driving system for rotatably driving the sprinkle rotors, a pendant system hanging the catalyst releasing device inside the reaction tank and being capable of adjusting the height hanging the catalyst releasing device, and a control means the controlling rotation frequency of the catalyst releasing device. The control means being structured to control the rotation driving system of the catalyst releasing device to cause the rotation frequency of the sprinkle rotor in the catalyst releasing device to periodically change between a predetermined maximum rotation frequency Nmax and minimum rotation frequency Nmin, in which maximum rotation frequency Nmax is defined as the rotation frequency to cause the catalyst that is released from the uppermost sprinkle rotor of the plural sprinkle rotor in the catalyst releasing device to reach down to around the bottom inner wall of the reaction tank, and in which the minimum rotation frequency Nmin is defined as the rotation frequency to cause the catalyst that is released from the uppermost sprinkle rotor to reach down to much the same position as the catalyst released from the second sprinkle rotor settles down just under the uppermost sprinkle rotor when the sprinkle rotor is rotated in the maximum rotation frequency Nmax. The diameter of each sprinkle rotor being defined as a measure to cause a position where the catalyst that is released from the lower sprinkle rotor of the mutually lengthwise adjacent sprinkle rotors settles down when the lower sprinkle rotor rotates in the maximum rotation frequency Nmax, and a position where the catalyst that is released from the upper sprinkle rotor of the mutually lengthwise adjacent sprinkle rotors settles down when the upper sprinkle rotor rotates in the minimum rotation frequency Nmin to be nearly equal to one another.

In the apparatus according to the present invention, it is preferable that the aforementioned control means controls to make the difference between a period of changing from the maximum rotation frequency Nmax to a regular rotation frequency in a changing domain of the rotation frequency from the maximum rotation frequency Nmax to the minimum rotation frequency Nmin, and the other period of changing from the regular rotation frequency to the minimum rotation frequency Nmin in order that the catalyst, released from each sprinkle rotor, is uniformly sprinkled in each rotation frequency of each sprinkle rotor from the maximum rotation frequency Nmax to the minimum rotation frequency Nmin.

For example, when the sprinkle of the catalyst is liable to cluster toward the inside due to the difficult roll of the catalyst, against the feeding period in the maximum rotation frequency Nmax, the feeding period at the minimum rotation frequency Nmin is defined to become longer and longer accordingly as the rotation frequency moves to the side of the minimum rotation frequency Nmin. Consequently, the catalyst released from each sprinkle rotor is sprinkled more uniformly.

On the other hand, when the sprinkle of the catalyst is liable to cluster on the outside due to the easy roll of the catalyst, considering that the rolling effect of the catalyst after settling down, against the feeding period in the maximum rotation frequency Nmax, the feeding period at the minimum rotation frequency Nmin is defined to become shorter and shorter accordingly as the rotation frequency moves to the side of the minimum rotation frequency Nmin.

According to the present invention as illustrated above, the catalyst released from the catalyst releasing device settles down before the speed constituent Ux in the radial direction of the reaction tank becomes zero, and then it stops one after another after rolling in the radial direction because of the speed constituent Ux in the radial direction. Therefore, the catalyst is fed uniformly in a scattering state in the radial direction, so that uniform feed having high density is achieved.

Furthermore, during the feed process, the rotation of the catalyst releasing device periodically changes from the maximum rotation frequency Nmax to the minimum rotation frequency Nmin, so that an initial speed releasing the catalyst is changed along with the changing of the rotation frequency. Therefore, once the down position has been settled, the catalyst is changed, the catalyst sprinkled area in the radial direction of the reaction tank is effected to be in a more uniformed state.

Using the apparatus including a multistage sprinkle rotor as the catalyst releasing device, the catalyst can be fed from each stage of the sprinkle rotor in every predetermined distance in the reaction tank. The size of each sprinkle rotor is defined so that all of the catalyst released from the sprinkle rotors contacting lengthwise with one another consecutively reach down to the position in the radial direction, so that the catalyst is fed in a more uniformed state. More specifically, since the position where the catalyst, released in the minimum rotation frequency Nmin from the upper sprinkle rotor of the mutually lengthwise adjacent sprinkle rotors, settles down is defined in much the same position where the catalyst, released in the maximum rotation frequency Nmax from the lower sprinkle rotor, settles down, the difference of the height on the surface of the catalyst fed from the sprinkle rotors, contacting with one another and oriented in a lengthwise direction, is not produced to be like a flat state. And also, the catalyst having the roll and the aforesaid speed constituent Ux in radial direction after settling down facilitates feeding in more uniformed state. Simultaneously, the rolling force causes a clustering state based on an angle of repose causing the catalyst sedimentation to disappear although the general feed by natural falling would form the clustering state.

BRIEF DESCRIPTION OF THE DRAWINGS

FIG. 9 (A) and FIG. 9 (B) are, respectively, a plan view and a sectional view of the third stage of the sprinkle rotor in FIG. 2;

FIG. 10 (A) and FIG. 10 (B) are, respectively, a plan view and a sectional view of the fourth stage of the sprinkle rotor in FIG. 2;

FIG. 11 (A) and FIG. 11 (B) are, respectively, a plan view and a sectional view of the fifth stage of the sprinkle rotor in FIG. 2;

DETAILED DESCRIPTION OF THE PREFERRED EMBODIMENTS(S)

The preferred embodiment of the present invention will now be described with reference to the drawings.

[FIRST EMBODIMENT]

Figure 1:
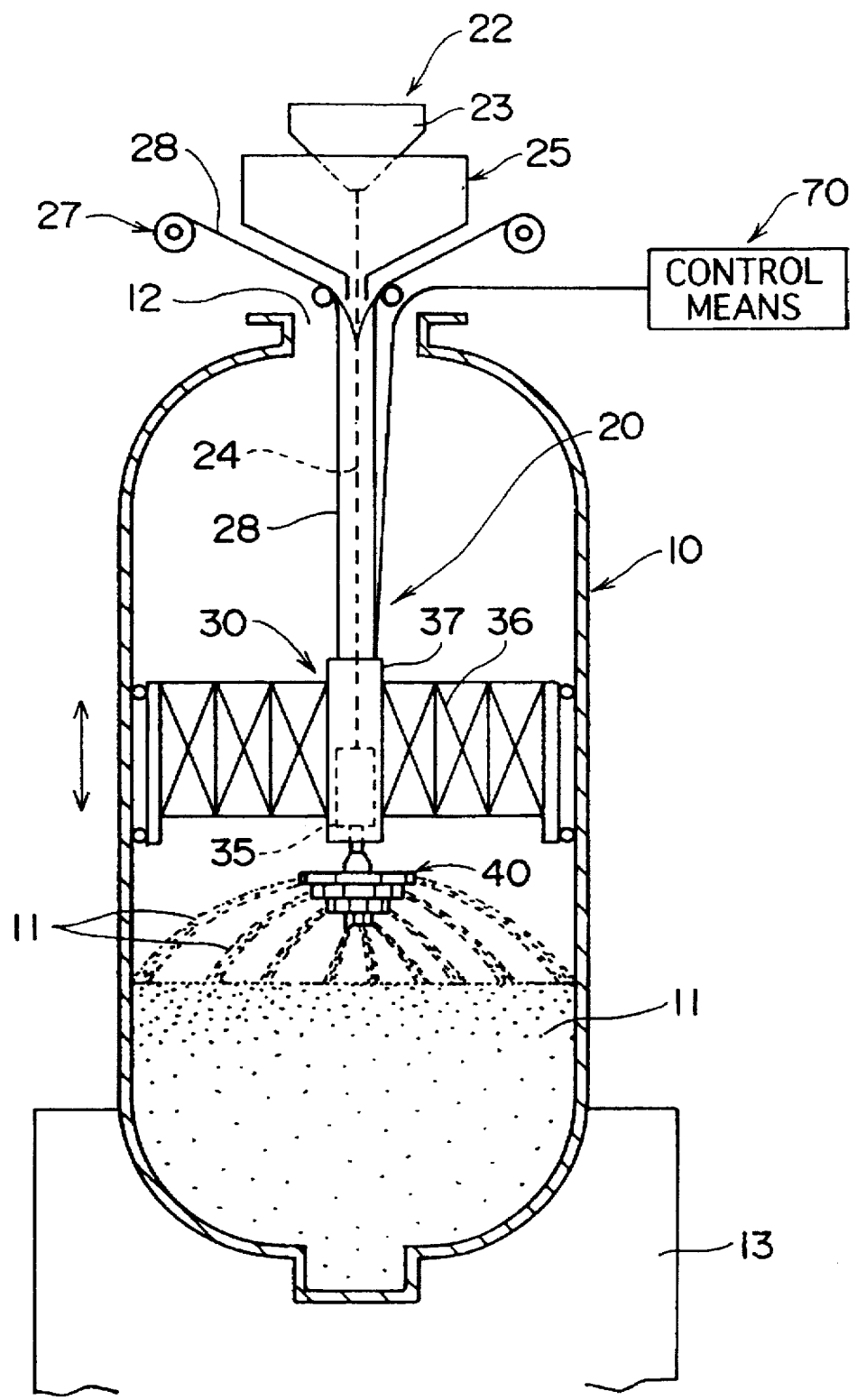
FIG. 1 is a diagrammatic sectional view of the appearance of the preferred embodiment according to the present invention.

FIG. 1 is a diagrammatic view illustrating a state of applying an apparatus and a method of feeding the catalyst according to the present invention. As can be seen from FIG. 1, a reaction tank 10 is of a large reaction tank which is shaped with a cylindrical side wall and a bottom plate to be fed with the catalyst therein, opened into the air at its opening 12 provided at an upper central portion and securely mounted at its bottom portion by a base 13.

An unshown frame by which an upper structure of a catalyst feeding apparatus 20 based on the present invention is supported is assembled at the upper position of the reaction tank 10.

The catalyst feeding apparatus 20 is composed of a catalyst releasing device 30 hung inside the reaction tank 10 to facilitate the rotating sprinkle with a catalyst 11, a pendant system 22 which has a suspender 24 such as a chain to hang with the catalyst releasing device 30 and a suspender winding system 23 causing the catalyst releasing device 30 to lift by winding up the suspender 24, a hopper system 25 supplying the sprinkled catalyst 11, and a hose winding system 27 winding up a hose 28 adapting to feed with the catalyst 11 from the hopper system to the catalyst releasing device 30. The hose 28 is composed of plural segments along its longitudinal direction, in which the plural segments are connected to one another by unshown zippers (fasteners made of nylon) to form into a hose shape and rolled up by the hose winding systems 27 in their separating state.

The catalyst releasing device 30 includes a rotation driving system 35 capable of causing a sprinkle rotor system 40 provided under the catalyst releasing device 30 inside the reaction tank 10 to rotatably drive in the normal and opposite directions. Furthermore, the catalyst feeding apparatus 20 includes a control means 70 in order to control the change in the rotation frequency of the aforesaid rotation driving system 35.

The catalyst releasing device 30, as will be illustrated below, rotatably sprinkles to release the catalyst 11 supplied from the hose 28 at a predetermined initial speed.

The catalyst releasing device 30 includes three supporting arms 36 extending toward the radial direction of the reaction tank 10 and its center is supported at the center of the reaction tank 10. Each supporting arm 36 has an expansion system of a pantagraph type, and its head portion is capable of abutting to an inner face of the reaction tank 10 and further vertically move with rollers, so that the catalyst releasing device 30 is adapted to be kept along the center of the reaction tank 10 by expanding the supporting arm 36 to go up and down reciprocally.

The hose winding system 27 employs an air-motor generating a rotating driving force for winding up the hose 28 by compressing air and capable of rotating in an opposite direction even though the driving force works in over load, so that the hose winding system 27 is controlled to regularly give the smaller driving force used for winding up sufficient weight for the catalyst releasing device 30 to drive the hose 28 by the control means 70 when the sprinkle of the catalyst is operated.

Consequently, the hose 28 is automatically pulled down by the weight of the catalyst releasing device 30, vertically moved down, even under the driving force of the air-motor when it is worked, and when the catalyst releasing device 30 is vertically moved up, the remaining length of the hose 28, pulled down once, is automatically wound up by the driving force of the air motor.

The control means 70 controls to take in and out the catalyst releasing device 30 to and from the reaction tank 10, and controls to carry out the feeding operation for the catalyst 11 in the required condition by controlling the rotating speed of the rotation driving system 35 in the catalyst releasing device 30, and by driving the suspender winding system 23 of the pendant system 22, which are based on the condition of feeding with the catalyst, program inputted from the outside or the like.

The control means 70 is composed of, for example, a computer, and includes an operation section composed of, for example, a keyboard in order to input the condition of feeding with the catalyst and a display in order to show various indications (both of them are unshown), a releasing control section which controls and calculates with a predetermined formula the rotation frequency in releasing, the quantity of the catalyst 11 released from the catalyst releasing device 30 and so on based on the condition defined by the operation section, a hanging height control section which controls the suspender winding system 23 based on the condition defined by the operation section to adjust the height of hanging the catalyst releasing device 30, and so on.

Figure 2:
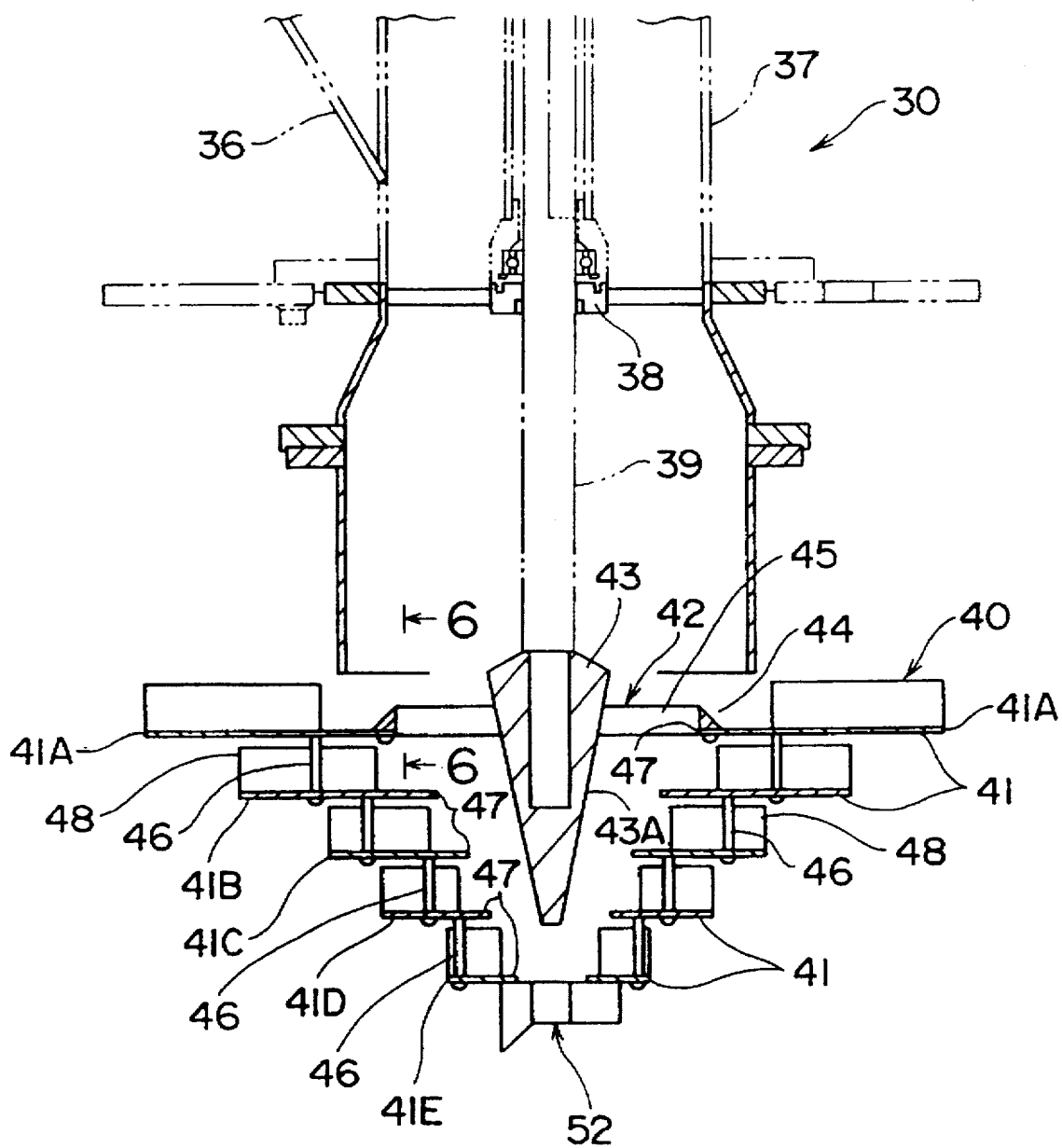
FIG. 2 is a diagrammatic sectional view of a five-stage sprinkle rotor used for the embodiment in FIG. 1.
Figure 3:
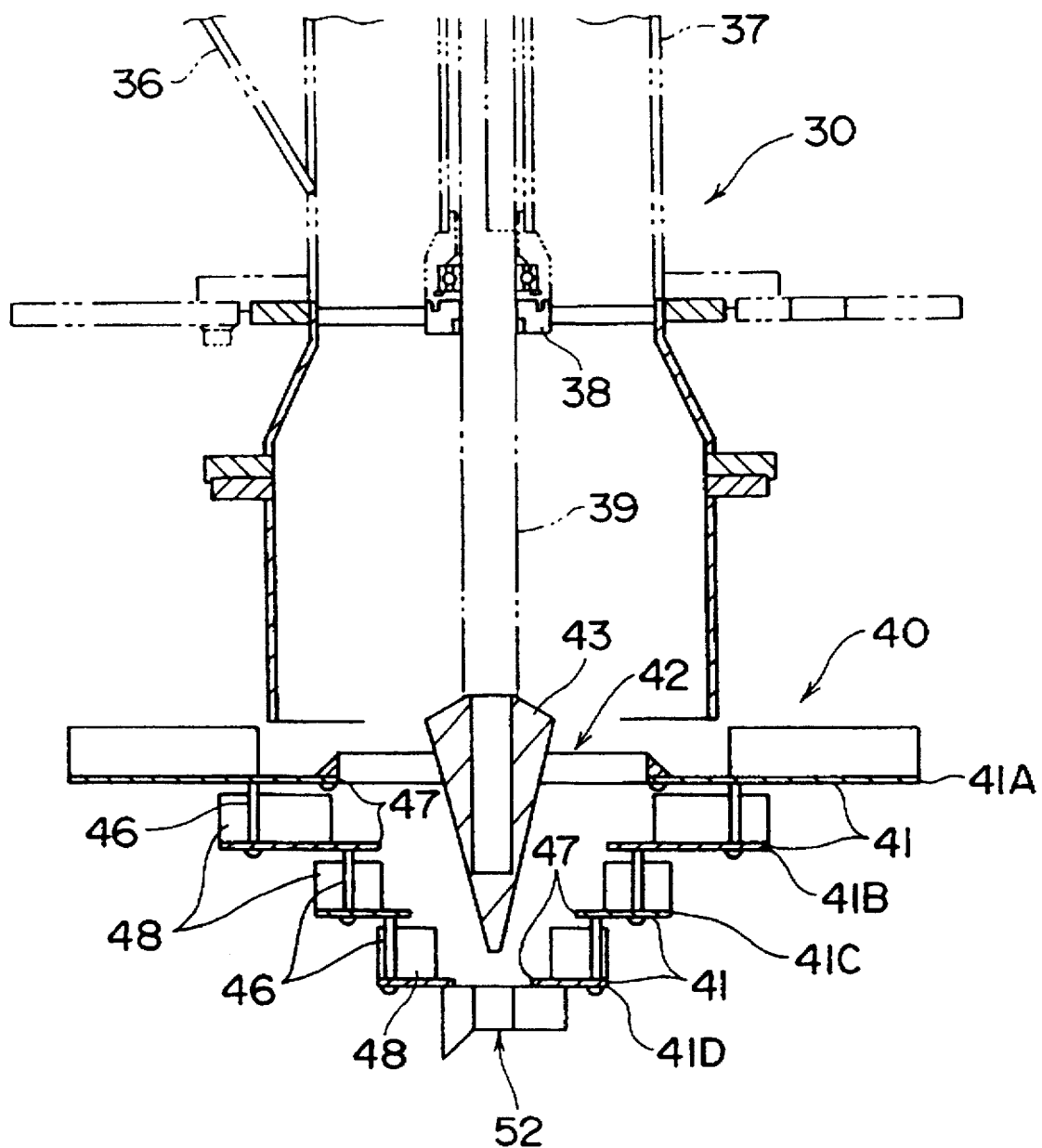
FIG. 3 is a diagrammatic sectional view of a four-stage sprinkle rotor used for the embodiment in FIG. 1.
Figure 4:
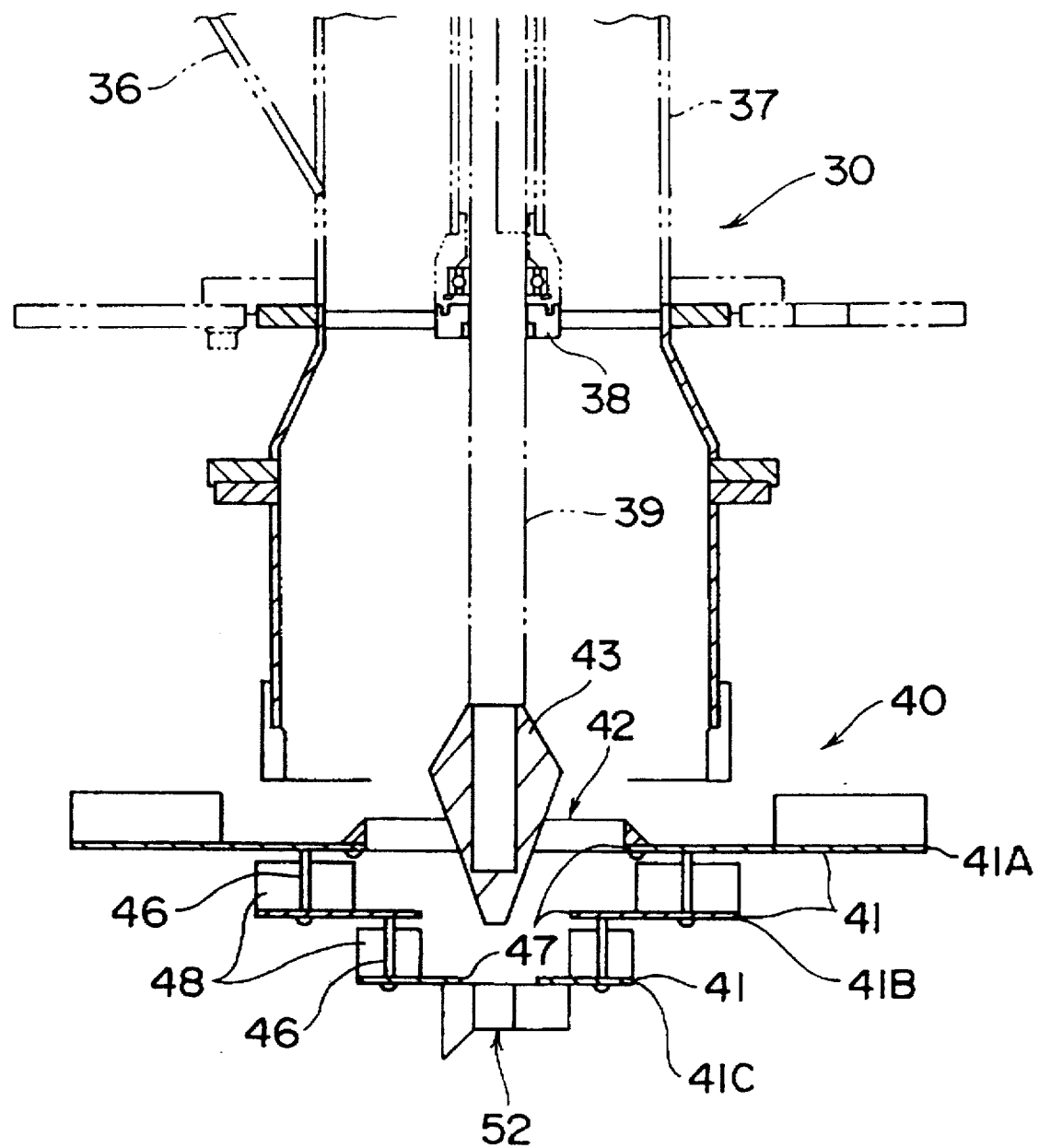
FIG. 4 is a diagrammatic sectional view of a three-stage sprinkle rotor used for the embodiment in FIG. 1.

Although a sprinkle rotor system 40 of the catalyst releasing device 30 has a different structure upon the size of the reaction tank 10 or the nature of the catalyst 11, for example, as shown in FIGS. 2, 3 and 4, the sprinkle rotor system 40 includes a disk sprinkle rotor 41 having plural, concretely five, four and three, stages, which mutually stages abuts parallel to one another in a vertical stratum with predetermined intervals. In FIGS. 2, 3 and 4, the shape of the sprinkle rotor system 40 in each case is not illustrated with a sectional view, but with an end view in order to enhance the clarity of the drawings. Furthermore, since a difference in the sprinkle rotor system 40 embodied in different types, respectively shown in FIGS. 2, 3 and 4, is the number of sprinkle rotors 41 except for a fine difference of the shape varied upon applying, the five-stage sprinkle rotor, which is embodied in the type shown in FIG. 2, will be illustrated while being referred to the numerals of the parts in FIGS. 5 to 12, but an explanation of the embodied types in FIGS. 3 and 4 will be omitted. In the embodied types in FIGS. 3 and 4, the same portion as or a structured portion corresponding with the embodied type in FIG. 2 will be denoted by the same reference numerals as FIG. 2.

In FIG. 2 and FIGS. 5 to 12, the catalyst releasing device 30 is supported by the supporting arm 36 and has a guide cylinder 37 to guide the catalyst 11, which guide cylinder 37 carries rotatably a driving shaft 39 along its center through arms and a bearing 38. And the driving shaft is integrally connected to a central circular conic member (central axis member) 43 passing through a supporting rib 42 in the sprinkle rotor system 40 at the bottom of the driving shaft 39.

Figure 5:
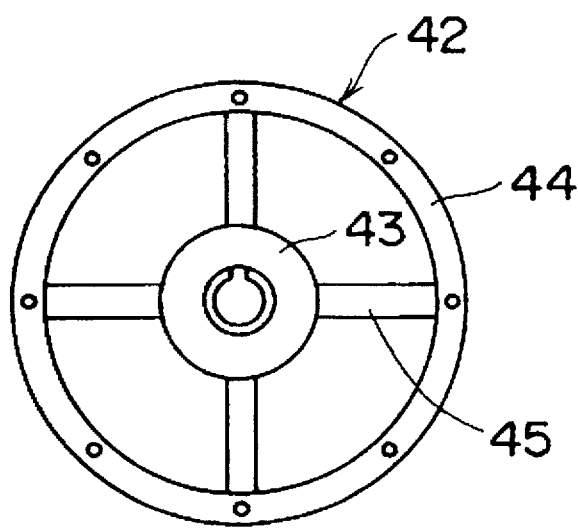
FIG. 5 is a bottom view of a supporting rib of the embodiment in FIG. 2.
Figure 6:
FIG. 6 is an end view along the VI—VI line in FIG. 2.

As is best shown from a bottom view of FIG. 5, the supporting rib 42 includes a ring member 44 and plural arm portions 45 each having a sectional triangular state (see FIG. 6) to connect the ring member 44 and the central circular conic member 43.

In FIG. 2, the uppermost sprinkle rotor 41A in the plural sprinkle rotor 41 is secured to the ring member 44 by a fixture :such as bolts. When the plural sprinkle rotors should be called in the lump or not be called at each of the stages, the sprinkle rotor will be referred as the numeral 41, and when the plural sprinkle rotors should be called at each of the stages, the numeral 41 will be added in A, B, C, D and E from the uppermost stage one after another.

More specifically, the second stage of the sprinkle rotor 41B is secured through a spacer 46 under the uppermost stage of the sprinkle rotor 41A by a fixture such as bolts. Similarly, the second and third stages, the third and fourth stages and the fourth and fifth (the lowermost stage in the embodiment) stages of the sprinkle rotor, namely, the sprinkle rotors 41B and C, 41C and D and 41D and E are respectively mounted through the spacers 46 by a fixture such as bolts.

Figure 7A:
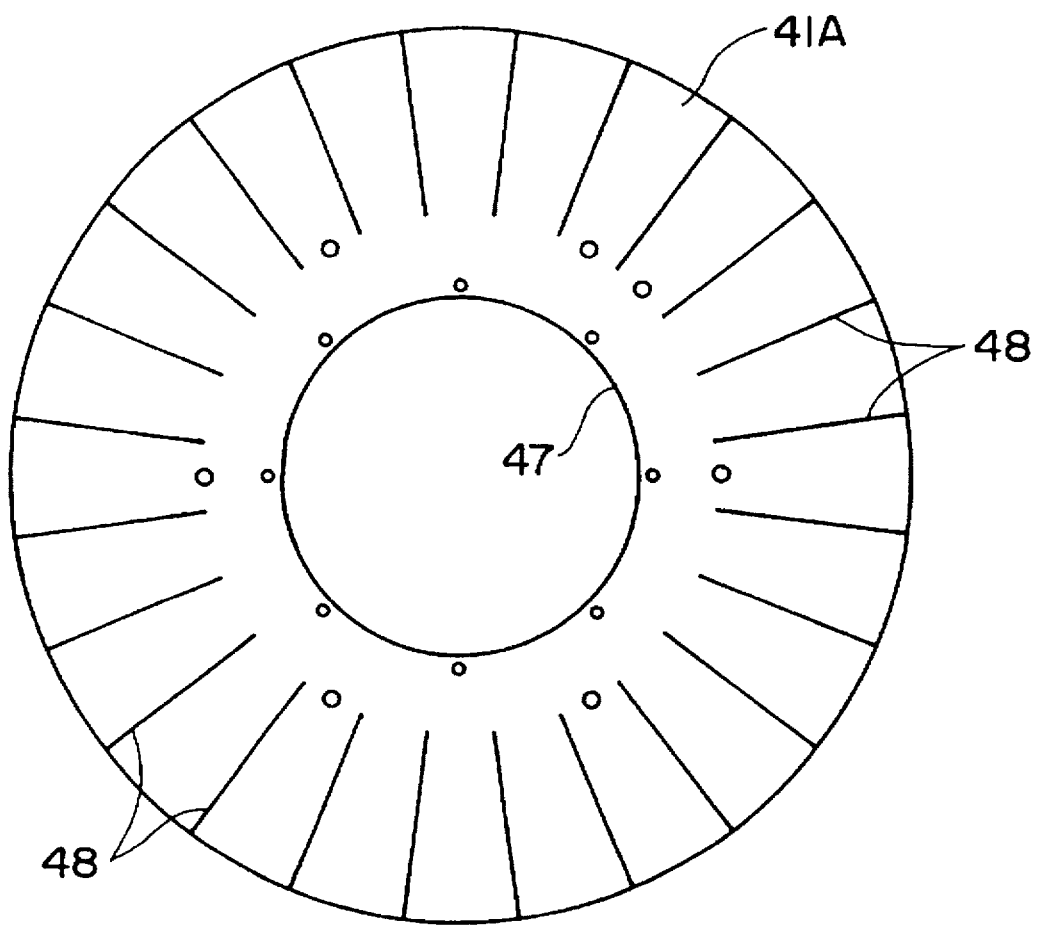
FIG. 7 (A) and FIG. 7 (B) are, respectively, a plan view and a sectional view of the first stage of the sprinkle rotor in FIG. 2.
Figure 7B:
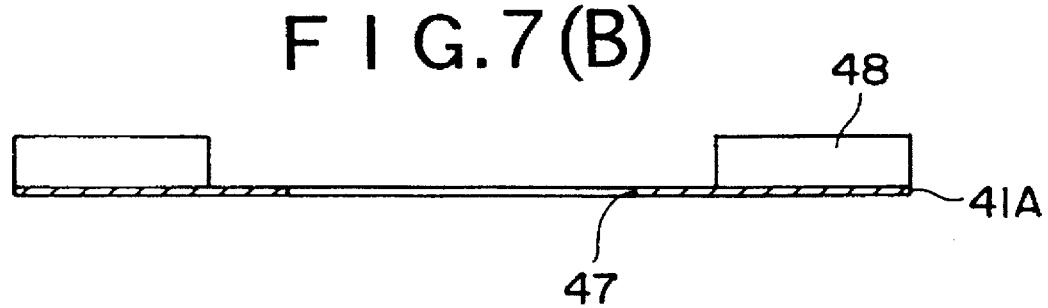
Figure 8A:
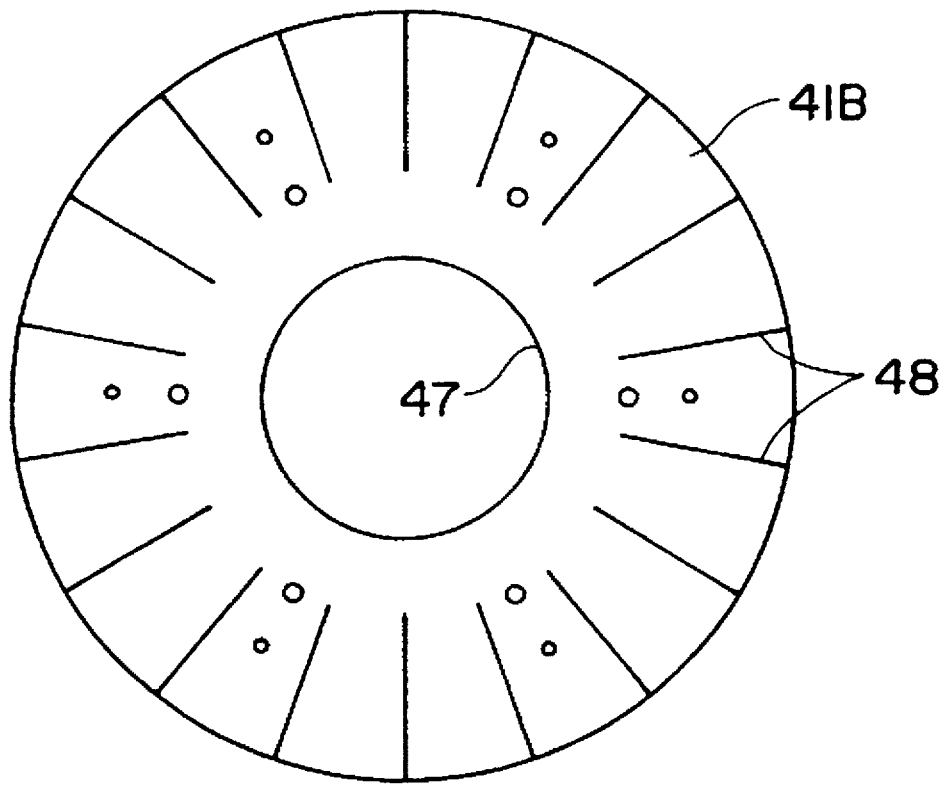
FIG. 8 (A) and FIG. 8 (B) are, respectively, a plan view and a sectional view of the second stage of the sprinkle rotor in FIG. 2.
Figure 8B:
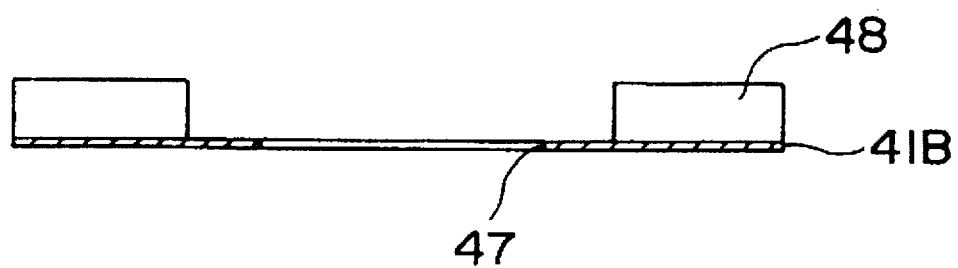

As shown in FIGS. 7 (A), (B) to 11 (A), (B), the sprinkle rotors 41A to 41E each have a hole 47 for the flow of the catalyst 11 at its center, plural partitive members 48 (the thickness is omitted in the drawing) on its surface, and further have, for example, other necessary holes for attaching. The holes 47 from the uppermost stage to the fourth stage of the sprinkle rotors 41A to 41D without the lowermost stage are each formed as a circle and the hole 47 of the lowermost stage of the sprinkle rotor 41E is formed as an ellipse. The partitive members 48 are arranged on the surface of the sprinkle rotors 41A to 41E in an equal angle and distance as its number resulted in 24 on the uppermost stage, 18 on the second stage, 12 on the third stage, 9 on the fourth stage and 5 on the lowermost stage according to the embodiment intending to apply the sprinkle rotor to the reaction tank of 4 meters in diameter. That is, the number of partitive members 48 is defined by a diameter of the reaction tank, the nature of the catalyst, the number and the outward measure of rotor stages, and so on.

Figure 12:
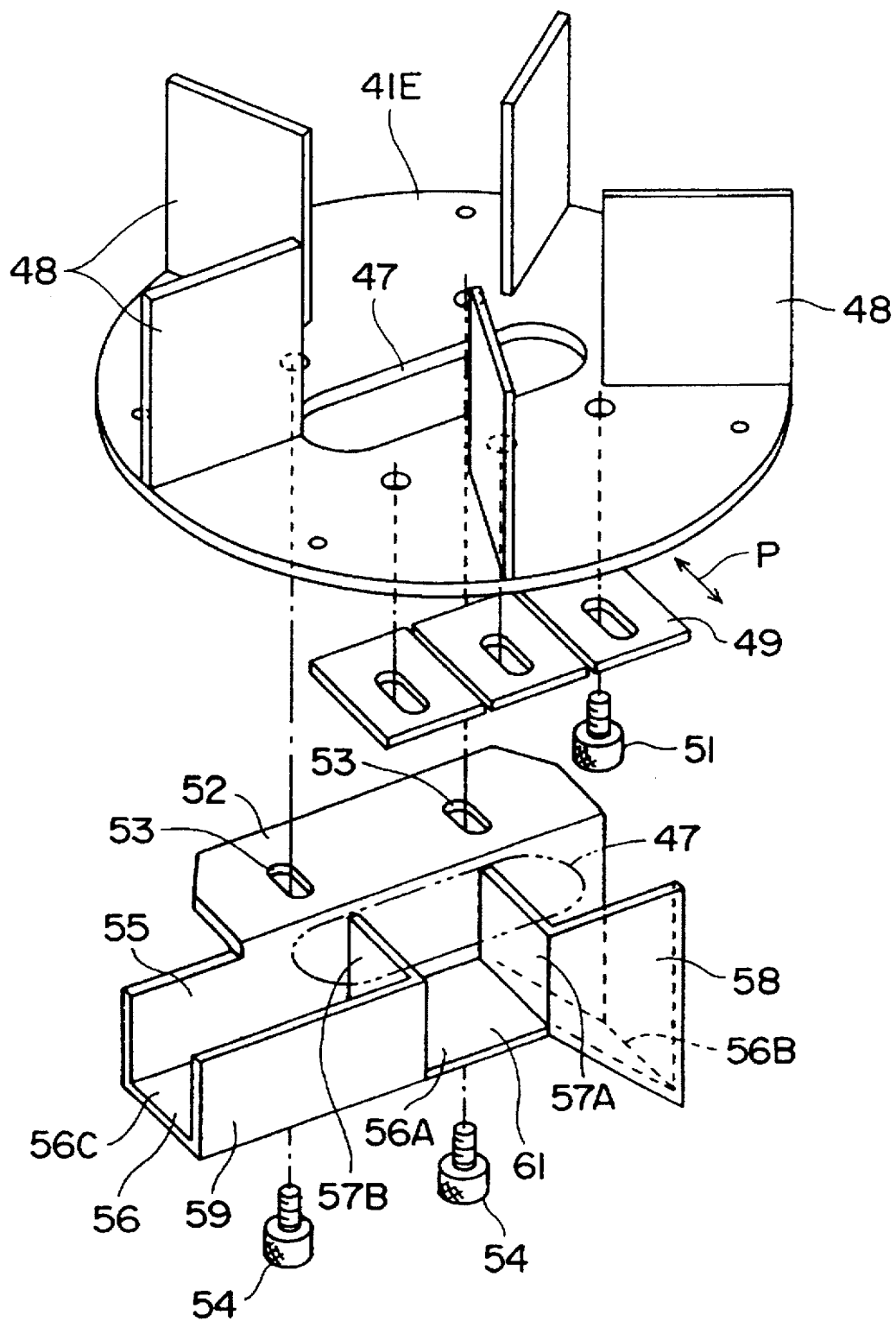
FIG. 12 a perspective exploded view of a guide member and the fifth stage of the sprinkle rotor in FIG. 2.

Under the lowermost stage of the sprinkle rotor 41E, as shown in FIG. 12, three adjusted plates 49 capable of adjusting an opening area of the ellipse hole 47 opened on the sprinkle rotor 41E are fixedly oriented to a position adjusted in the direction of the arrow P by screws 51, the flow quantity of the catalyst 11 flowing downward through the hole 47 can be adjusted.

Furthermore, a guide member 52 is fixed to the position adjusted by ellipse holes 53 and bolts 54 under the lowermost stage of the sprinkle rotor 41E. The guide member 52 has a guide face 55 extending downward from an end edge of the attaching face forming the ellipse holes 53, and a receiving face 56 is formed at the bottom edge of the guide face 55. The receiving face 56 is partitioned into three portions of a middle portion 56A and both end portions 56B and 56C with two separating plates 57A and 57B. The end portion 56B is extended in the slant downward direction and has the guide face 55 and a flooding stopper 58 provided at the opposite guide face 55 on its lateral end edge so as to stop the catalyst 11 from flooding. The other end portion 56C is horizontally extended and has a flooding stopper 59 accompanying with the separating plate 57B like a case of the end portion 56B on its lateral end edge of the opposite side of the guide face 55. And the middle portion 56A has an opening as a running lead 61 on the opposite side of the guide face 55.

The use of the aforesaid guide member enables the catalyst 11 flowing through the hole 47 to sprinkle uniformly in a concentric circle state because of the degree of the slant or the rotation after falling down along the guide face 55 and being received on the receiving face 56. More specifically, the catalyst 11 falling down to the middle portion 56A on the receiving face 56 is sprinkled around the center of the reaction tank 10 by immediately falling down from the running lead 61 opposite to the guide face 55. On the other hand, the catalyst 11 falling down to both of the end edges 56B and 56C is carried to the end portion along the guide face 55 and the flooding stoppers 58, 59 so as to sprinkle on the outside of the place sprinkled from the running lead 61 and on the extreme outside in a concentric circle state.

A taper angle of a taper face 43A forming the central circular conic member 43 connected to the driving shaft 39, a distance between the taper face 43A and the hole 47 of each sprinkle rotor 41 and a distance between the sprinkle rotors 41, which affect the sprinkling condition of the catalyst 11 flowing through the sprinkle rotor system 41, are defined after being found by calculation and experimentation based on the calculation, and then the final shape of the sprinkle rotor is decided.

A method of deciding the measure of each part in the sprinkle rotor system 40 will be explained with reference to FIG. 13.

Figure 13:
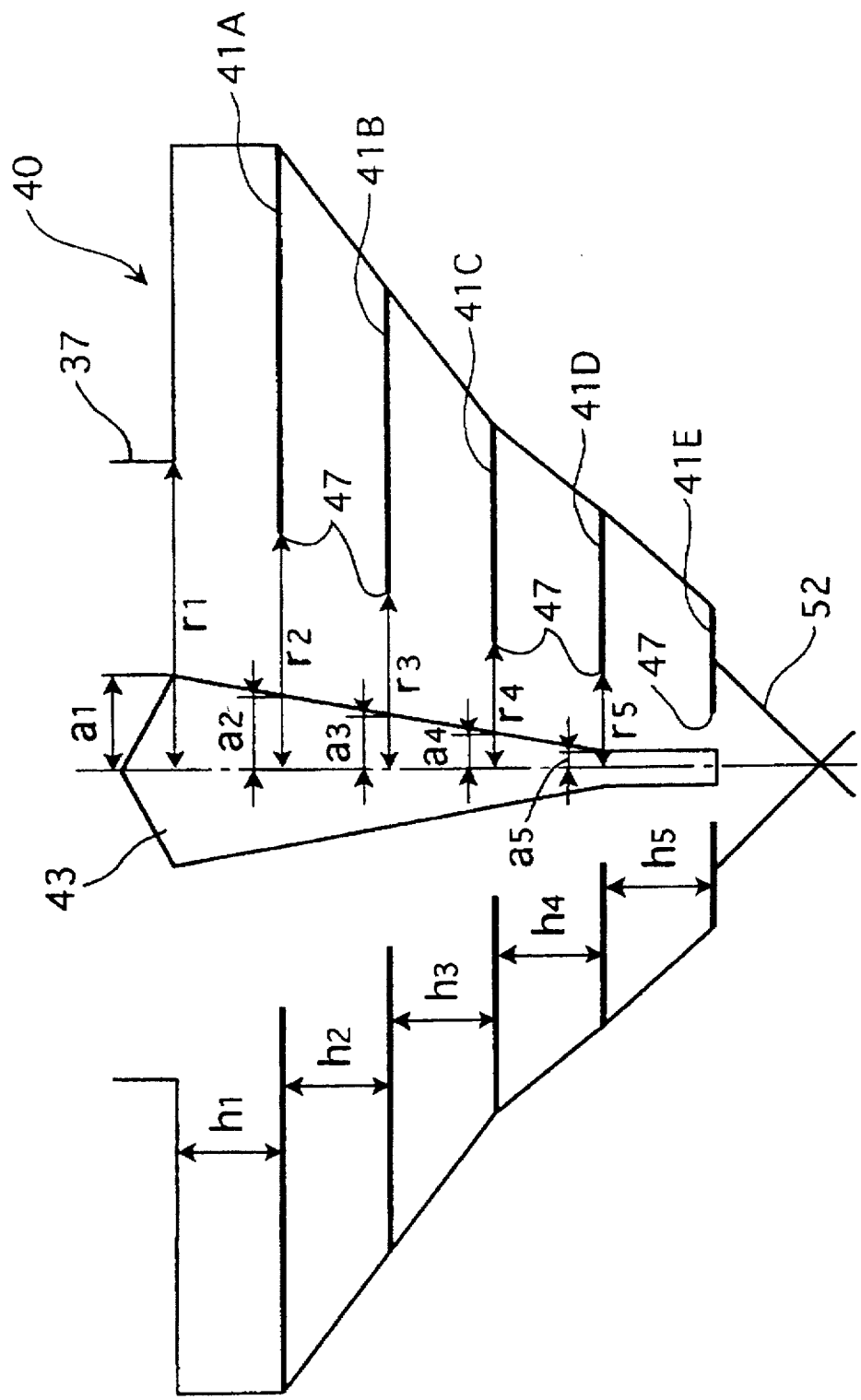
FIG. 13 is a diagrammatic view of the size of the respective parts in the five-stage sprinkle rotor of the embodiment.

In FIG. 13, an opening shape of a catalyst inflow portion, or a throat portion, of the sprinkle rotor system 40 is to be a value subtracting a radius $a_1$ of the central circular conic member 43 horizontally corresponding to a position of a radius $r_1$ from the inside diameter, or radius, $r_1$ of the guide cylinder 37, namely, the opening in the uppermost stage of the sprinkle rotor 41A is resulted in the $(r_1-a_1)$. The height of the sprinkle rotor 41A as the first stage is to be $h_1$, and the outflow (sprinkling) condition of the catalyst 11 is changed by these $r_1$, $a_1$ and $h_1$ and the rotor radius $R_1$.

The opening in the second stage of the sprinkle rotor 41B is to be a radius $r_2$—a radius $a_2$ which is equal to the remainder of the measure of the hole 47 in the first stage of the sprinkle rotor 41A and the measure of the central circular conic member 43 horizontally corresponding to the hole 47 and the height of the sprinkle rotor is to be $h_2$. Similarly, openings of the sprinkle rotors 41C, 41D and 41E are decided by measures $r_3$, $a_3$ and $h_3$, measures $r_4$, $a_4$ and $h_4$ and measures $r_5$, $a_5$ and $h_5$.

The method of deciding on a suitable measure in the opening (the throat portion) will be set forth below.

The throat portion fills the role of delivering the catalyst charge amount to each of the sprinkle rotors 41. Consequently, the area on which each of the sprinkle rotors 41 sprinkles (feeds) with the catalyst should be equal to the ratio of the area of throat in order to achieve the uniform sprinkle. Considering a case of the sprinkle rotor of an i stage (No i), it is to be:

[Inflow quantity from the sprinkle rotor of No i-1]=
[Sprinkle quantity in the sprinkle rotor of No i]+
[Outflow quantity to the sprinkle rotor of No i+1]

The aforesaid case will be represented as a basic equation with using the aforesaid r, a and h in FIG. 13.

The following equation should be constructed from a distance between the center of the reaction tank 10 and the catalyst 11 fed by each sprinkle rotor 41 (a position settled down) Li, the central axis radius ai and the opening radius ri.

$$\frac{\pi(r_i^2 - a_i^2)}{\pi(r_{i-1}^2 - a_{i-1}^2)} = \frac{\pi \cdot L_i^2}{\pi \cdot L_{i-1}^2} \quad \text{[EQUATION 1]}$$

The following equation should be constructed because the opening height (hi) of each rotor 41 is proportional to the settling area of the catalyst 11 fed from each rotor 41.

$$\frac{2\pi r_i h_i}{2\pi r_{i-1} h_{i-1}} = \frac{\pi(L_i + \Delta L_i)^2 - \pi L_i^2}{\pi(L_{i-1} + \Delta L_{i-1})^2 - \pi L_{i-1}^2} \quad \text{[EQUATION 2]}$$

Considering the fed catalyst 11 as a single particle, the following equation will be constructed.

$$\frac{2\pi r_i h_i}{2\pi r_{i-1} h_{i-1}} = \frac{2\pi L_i}{2\pi L_{i-1}} \quad \text{[EQUATION 3]}$$

Consequently, the measure of each part is decided by the aforesaid equations.

According to the embodiment explained thus far, the sprinkle of the catalyst in the reaction tank 10 will be carried out in the following order.

The catalyst releasing device 30, first, is hung inside the reaction tank 10 by the suspender winding system while the supporting arms 36 are not extended, and then the catalyst releasing device 30 is supported to be kept along the center line of the reaction tank by the three supporting arms 36 extended to the inner wall of the reaction tank when settling close to the bottom portion of the reaction tank.

In the aforesaid state, the releasing control system of the control means 70 causes the catalyst releasing device 30 to work in the predetermined rotation frequency and releasing quantity so as to sprinkle inside the reaction tank 10 with the catalyst 11 supplied from the hopper system 25 through the hose 28.

In the moment of working the releasing control system, if the required feeding density is previously defined in the operation portion, a suitable sprinkling height can be defined automatically and the height of hanging the catalyst releasing device 30 is adjusted to be in the defined height to sprinkle the catalyst.

The aforementioned sprinkling height is defined in a lower position than a conventional height in the present invention in order to cause the settled catalyst 11 to roll in some degree and then to stop. That is, since the conventional height is defined in a higher position from the surface of the fed catalyst, the catalyst released from the catalyst releasing device has settled down to the catalyst surface in the general zero state of a speed constituent Ux in a radial direction of the reaction tank 10, with the result that the catalyst stops without rolling after settling down. On the other hand, in the present invention, since the catalyst 11 released from the catalyst releasing device 30 has some value for the speed constituent Ux in a radial direction, namely, is defined as Ux>0, the catalyst 11 after settling down rolls in a radial direction and then stops so as to smooth the sedimentary surface.

And, advancing the sprinkle, the surface of the catalyst 11 inside the reaction tank 10 is rising. Thus, whenever the rising quantity of the fed catalyst exceeds the predetermined quantity, the catalyst releasing device 30 is lifted up by the suspender winding system 23 in order to maintain control at the predetermined height of the fed catalyst.

The sprinkle with the catalyst from the predetermined height and the adjustment of the height of the catalyst releasing device 30 are repeated, and when the catalyst releasing device 30 settles its rising limit inside the reaction tank 10, the rotation frequency of sprinkling with the catalyst is increased in response to a fall in the sprinkling height by raising the surface of the catalyst 11 in order to secure sprinkled limits, and then the sprinkling operation is completed when the surface of the fed catalyst settles the predetermined height.

In the sprinkling operation, when there are obstacles such as plumbing inside the reaction tank 10, the motor of the rotation driving system 35 is switched either to the right or in the opposite rotating direction at predetermined intervals. Therefore, the catalyst 11 can be equally sprinkled around the obstacle.

Figure 14:
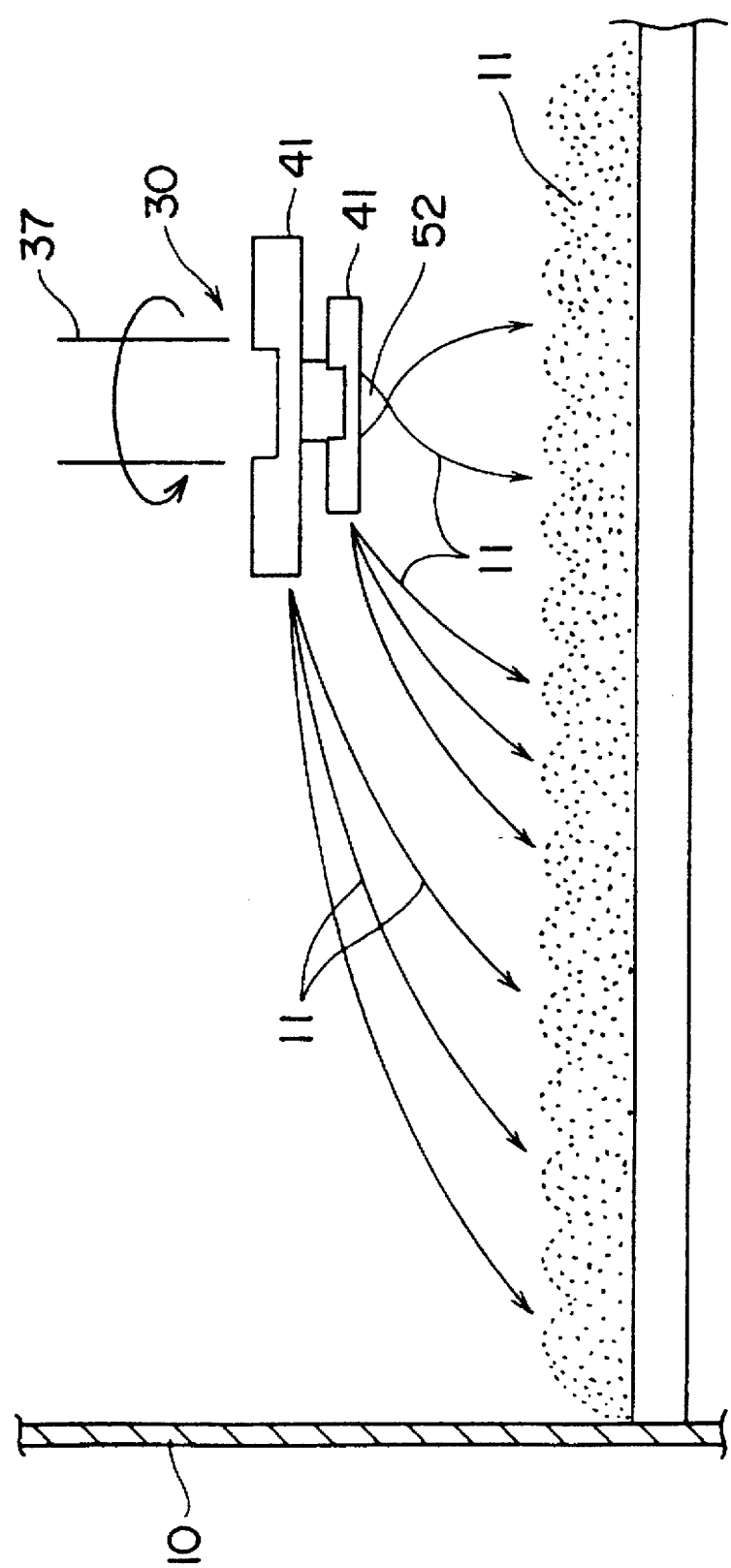
FIG. 14 is a schematical view of a state of sprinkling the catalyst of the embodiment.

As shown on a schematic view in FIG. 14, in the sprinkling operation, the sedimentary state of the sprinkled catalyst 11 under the definite rotation frequency inside the reaction tank 10 is to be a sectional angle having a prescribed angle of repose in multiple concentric circles.

Therefore, in the present invention, the rotation of the catalyst releasing device 30 is periodically changed from a maximum value (the maximum rotation frequency Nmax) to a minimum value (the minimum rotation frequency Nmin) so that the sedimentary surface of the catalyst 11 becomes smoother by filling each valley between hills made by the sprinkled catalyst. The maximum value Nmax of the rotation frequency is defined as a value in which the catalyst released from the uppermost sprinkle rotor 41A settles the bottom of the inner wall position of the reaction tank 10 when the sprinkle rotor 41 of the catalyst releasing device 30 is rotated in the maximum rotation frequency Nmax. And, the minimum value Nmin is defined as a rotation frequency in which the catalyst 11 released from the uppermost sprinkle rotor 41A settles down to a position settled down by the catalyst 11 released from the second sprinkle rotor 41B when the sprinkle rotor 41 is rotated in the maximum rotation frequency Nmax. In short, the catalyst 11 released from the uppermost sprinkle rotor 41A with centrifugal force in the rotation frequency Nmin settles down to the same position as the catalyst 11 released from the second sprinkle rotor 41B with centrifugal force in the rotation frequency Nmax.

Therefore, when the catalyst releasing device 30 is adapted to change periodically its rotation frequency from Nmax to Nmin, the catalyst 11 released from the uppermost sprinkle rotor 41A is consecutively fed in limits from the inner wall of the reaction tank 10 to the position settled down by the catalyst 11 released from the second sprinkle rotor 41B in the rotation Nmax inside the reaction tank 10, so that the sedimentary surface of the catalyst between the limits is fed to an equal height (levelly).

As in the above consideration, diameters of the third sprinkle rotor 41C, fourth sprinkle rotor 41D and fifth sprinkle rotor 41E are defined as measure to cause the positions settled down by the catalyst 11 released from the sprinkle rotors 41B, 41C and 41D operating in the minimum rotation frequency Nmin of the catalyst releasing device 30 to generally agree with the position settled down by the catalyst 11 released from the sprinkle rotors 41C, 41D and 41E operating in the maximum rotation frequency Nmax.

Next, in the present invention, a way to find the maximum rotation frequency Nmax of the catalyst releasing device 30, the minimum rotation frequency Nmin of the catalyst releasing device 30 and the rotor length (radius) R of each sprinkle rotor 41 will be illustrated below.

Generally, the following are defined,

L: a distance until a required position settled by the catalyst in a horizontal direction (m)
(a distance from the center of the reaction tank to the fed surface, or the position settled by the catalyst)

H: a height from the fed surface to the sprinkle rotor (m)

R: a rotor radius (m) time θ (sec) taken to reach down the catalyst to the fed surface of the feeding catalyst particle will be represented in the following equation:

$$\Theta = \frac{\cosh^{-1}\{\exp(A \cdot H)\}}{\sqrt{1+B^2}}$$ [EQUATION 4]

It is provided that A, B each should be a constant decided by a physical property of a particle and the feeding atmosphere.

And, the initial speed Uo (m/sec) of the feeding catalyst particle will be defined by the following equation.

$$Uo = \left\{ \exp\sqrt{\frac{L^2-R^2}{C}-1} \right\} \cdot \frac{C}{\Theta}$$ [EQUATION 5]

It is provided that C should be a constant decided by a physical property of a particle and the feeding atmosphere.

The distance L (m) from the center of the reaction tank will be found by the following equation.

$$L = \sqrt{\left\{ C \cdot \ln 1 + \frac{Uo \cdot \Theta}{C} \right\}^2 + R^2}$$ [EQUATION 6]

The rotation frequency N (rpm) of the sprinkle rotor will be found by the following equation.

$$N = \frac{Uo}{2 \cdot \pi \cdot R} \cdot 60$$ [EQUATION 7]

Value of the aforementioned constants A, B and C in the air atmosphere concerning the catalyst particle having trifoliate shape in length 4 mm and breadth 1 mm will be shown by the following.

A=0.24, B=6.35, C=4.17

When the above figures are used and the distance from the center of the reaction tank is assumed to be L, or the radius of the reaction tank 10 is assumed to be D/2, and also the fed height is assumed to be H, the result found of the initial speed Uo will be offered in Table 1.

TABLE 1

| D (m) | H (m) | Uo (m/sec) |
|---|---|---|
| 4 | 2 | 3.72 |
| 4 | 1 | 5.47 |
| 4 | 0.5 | 7.89 |
| 2 | 2 | 1.64 |
| 2 | 1 | 2.41 |

As is known from the above TABLE 1, in the case of the reaction tank 10 of four meters in diameter, when the height H from the sedimentary catalyst surface to the catalyst releasing device 30 is 2 m, the initial speed Uo needs to be 3.72 m/sec, and when the height H is 0.5 m, the initial speed Uo needs to be 7.89 m/sec. The initial speed Uo, in the case of the reaction tank 10 of two meters in diameter, is also found by the above TABLE 1.

According to the aforementioned discussion, there is a following way to decide the sprinkle rotor radius R.

A) Calculation for Nmax

When considering of feeding to the reaction tank 10, first, an initial speed U1 when the fed catalyst particle fed from the sprinkle rotor 41A having the largest diameter settles a position just before the inner wall of the reaction tank 10 may be found.

2L=(the reaction tank diameter: D)/2 can be defined and Nmax is calculated with EQUATIONs 4, 5 and 7. That is, Nmax is N, it is found by substituting U1 found in EQUATIONs 4 and 5 into EQUATION 7.

B) Calculation for Nmin:

Initial speed, which causes the position settled down by the fed catalyst released in the maximum rotation frequency Nmax toward the farthest position in an outside direction from the second sprinkle rotor 41B of the sprinkle rotor system 40 or the guide member 52 under the sprinkle rotor 41 and the position settled down by the fed catalyst released from the sprinkle rotor 41A having the largest diameter or the sprinkle rotor 41E having the smallest diameter to be one and the same position, is found with EQUATIONs 4 and 5, and then Nmin is calculated from EQUATION 7.

More specifically, a settling position L2 is found by substituting the initial speed U2 of the catalyst 11 released from the guide member 52 in the maximum rotation frequency Nmax into EQUATION 5, next, the initial speed U3 of the sprinkle rotor 41E having the smallest diameter in state of U2, and then rotation frequency N found by substituting U3 into EQUATION 7 is Nmin.

C) Calculation for the sprinkle rotor radius

When the number of sprinkle rotors is defined as n (five in the embodiment of FIG. 2), the rotor radius of number n (Rn) should be decided from the following equation in order to feed with the catalyst particle over the whole fed surface.

$$R_n^2 - R_{n-1}^2 = C^2 \cdot \left[ \left\{ \ln 1 + \frac{U_{max} \cdot \Theta_{n-1}}{C} \right\}^2 - \left\{ \ln 1 + \frac{U_{min} \cdot \Theta_n}{C} \right\}^2 \right]$$ [EQUATION 8]

A concrete example of calculation will be shown.
Restriction on analysis is defined as follows:

① Largest sprinkle rotor radius R; 200 mm

② Smallest opening radius r; 25 mm

③ Opening radius of throat entrance; 80~120 mm

④ Central circular conic member (central axis) portion; design for circular conic in view of actual manufacturing.

Under the above restriction, each sprinkle rotor radius R, opening radius of each stage entrance r, central circular conic radius a and opening height h in the calculated sprinkle rotor system 40, the result of analysis will be indicated in TABLES 2 to 4. The shape as an example of the five stages is illustrated in FIG. 13 wherein suffixes (1~5) of r, a and h show each stage.

The number of stages results in the number of concentric circles drawn on the fed surface so that the larger number of stages are convenient, however, under the present restriction, or the restriction of the largest sprinkle rotor radius and the opening smallest radius, the number of stages is limited to five stages.

TABLE 2

The result calculated for the five stages rotor (unit: mm)

| the number of stages: i | sprinkle rotor radius: R | opening radius of each stage entrance: r | central circular conic member radius: a | opening height: h |
|---|---|---|---|---|
| 1 | 200 | 100 | 30 | 29 |
| 2 | 153 | 76 | 24 | 29 |
| 3 | 109 | 56 | 18 | 29 |
| 4 | 83 | 41 | 12 | 29 |
| 5 | 50 | 30 | 5 | 30 |

TABLE 3

The result calculated for the four stages rotor (unit: mm)

| the number of stages: i | sprinkle rotor radius: R | opening radius of each stage entrance: r | central circular conic member radius: a | opening height: h |
|---|---|---|---|---|
| 1 | 200 | 100 | 29 | 29 |
| 2 | 131 | 75 | 22 | 29 |
| 3 | 86 | 56 | 15 | 29 |
| 4 | 55 | 40 | 8 | 30 |

TABLE 4

The result calculated for the three stages rotor (unit: mm)

| the number of stages: i | sprinkle rotor radius: R | opening radius of each stage entrance: r | central circular conic member radius: a | opening height: h |
|---|---|---|---|---|
| 1 | 200 | 98 | 28 | 29 |
| 2 | 114 | 61 | 18 | 29 |
| 3 | 65 | 35 | 6 | 29 |

Periodical change of the rotation frequency is calculated with the following assumption.

Average catalyst length/breadth; 4/1 mm

The height from the first (uppermost) stage of the sprinkle rotor to the sedimentary catalyst surface; 200 cm The above result will be indicated in TABLES 5 to 7. Incidentally, the average length catalyst particle means the catalyst particle having the average measure although the lengthwise measure of the catalyst 11 is irregular.

Since the catalyst has a difficult shape for rolling, the rolling effect after settling down cannot be anticipated. Therefore, as the rotation frequency goes nearer to the side of the minimum rotation frequency in the whole rotation frequency from the minimum rotation frequency Nmin to the maximum rotation frequency Nmax, a feeding period is defined to get longer so as to sprinkle uniformly with the released catalyst.

TABLES 5 to 7 show the rate of the feeding period in other rotation frequencies when the feeding period in the maximum rotation frequency is defined as 1.

TABLE 5

The periodical pattern of the rotation frequency (case of the five stages)

| Rotation frequency [rpm] | settling position of average length catalyst particle [cm] | Feeding period [—] |
|---|---|---|
| 167 (=Nmax) | 200 | 1 (assumption) |
| 162 | 195 | 1.01 |
| 156 | 190 | 1.01 |
| 151 | 185 | 1.02 |
| 146 | 180 | 1.03 |
| 141 | 175 | 1.03 |
| 136 | 170 | 1.04 |
| 131 (=Nmin) | 165 | 1.05 |

TABLE 6

The periodical pattern of the rotation frequency (case of the four stages)

| Rotation frequency [rpm] | Settling position of average length catalyst particle [cm] | Feeding period [—] |
|---|---|---|
| 167 (=Nmax) | 200 | 1 (assumption) |
| 159 | 193 | 1.01 |
| 151 | 185 | 1.02 |
| 144 | 177 | 1.03 |
| 136 | 170 | 1.04 |
| 129 | 162 | 1.05 |
| 122 | 155 | 1.06 |
| 115 (=Nmin) | 147 | 1.07 |

TABLE 7

The periodical pattern of the rotation frequency (case of the three stages)

| Rotation frequency [rpm] | Settling position of average length catalyst particle [cm] | Feeding period [—] |
|---|---|---|
| 167 (=Nmax) | 200.0 | 1 (assumption) |
| 157 | 190.5 | 1.01 |
| 147 | 181.0 | 1.03 |
| 138 | 171.5 | 1.04 |
| 128 | 162.0 | 1.05 |
| 119 | 152.0 | 1.07 |
| 111 | 143.0 | 1.08 |
| 102 (=Nmin) | 133.5 | 1.09 |

According to the present invention, the following efficiency will be produced.

In the method of the present invention, since the catalyst feeding apparatus sprinkles with the catalyst from a lower position than the conventional position, the catalyst settled down rolls in a radial direction of the reaction tank 10 so as to be arranged regularly, in other words, to be arranged in configuration which the length direction of the catalyst 11 is oriented to the circumferential direction generally, with the result that the feeding density is increased and also a smooth fed surface is achieved. Furthermore, since the rotation frequency of the catalyst releasing device 30 is periodically changed, the uneven surface which has been produced by the regular rotation frequency would not be produced, thus, in this point of view, the leveler fed surface is facilitated.

Consequently, since reacting gas-liquid to be processed flows throughout the reaction tank 10, the catalyst 11 is used equally, which brings effectiveness for the catalyst 11 having a longer life.

With equal feeding, abnormal reaction of the partial catalyst 11 and hot spot produced by the abnormal reaction can be prevented.

Operating time of the catalyst releasing device 30 is defined to be held for a longer period relative to the rotation frequency getting smaller, so that the feeding catalyst quantity is almost fixed in spite of periodical changing of the rotation frequency, thereby the uniform feeding is realized.

The catalyst releasing device 30 of the present invention has a structure assembling the multistage sprinkle rotor 41 in a state of concentric circles. The diameter of each vertically adjoining stage of the sprinkle rotor 41 is defined as measure causing a settling distance of the catalyst 11 when the first, or largest sprinkle rotor 41 is operated in the minimum rotation frequency and other settling distance of the catalyst 11 when the lowermost, or smallest sprinkle rotor 41 is operated in the maximum rotation frequency to balance with one another, with the result that the sprinkle with the catalyst 11 is facilitated in a radial direction in the consecutive state so as to enable to feed uniformly (levelly).

The structure of the catalyst releasing device 30 as aforesaid is composed of parts having a simple shape such as a disk, which enables construction at a small cost with a simple structure and to obtain a stable performance.

Each measure of each sprinkle rotor radius K, the opening radius r, the central circular conic member radius a, the opening height h and so on in the sprinkle rotor system 40 is properly decided by being calculated with the aforesaid predetermined equation, so that the catalyst quantity sprinkled from each sprinkle rotor 41 becomes uniform.

Although there are obstacles such as plumbing inside the reaction, the catalyst 11 can be equally sprinkled around the obstacle by reason of the catalyst releasing device 30 capable of rotating to the right or opposite direction at predetermined intervals.

Figure 15:
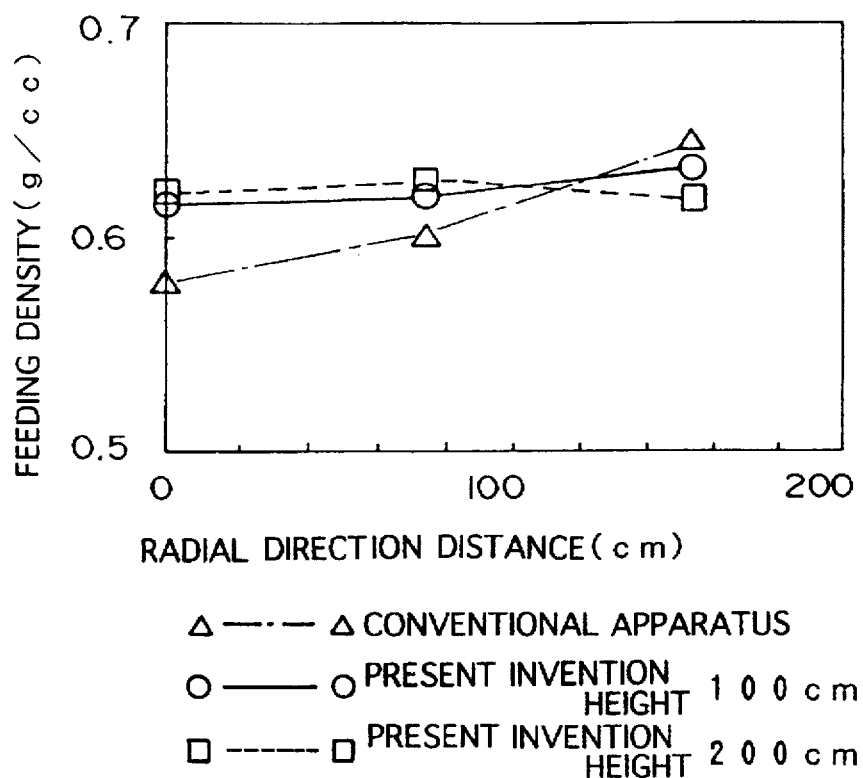
FIG. 15 is a graph of a feeding density showing an effect on the embodiment.
Figure 16:
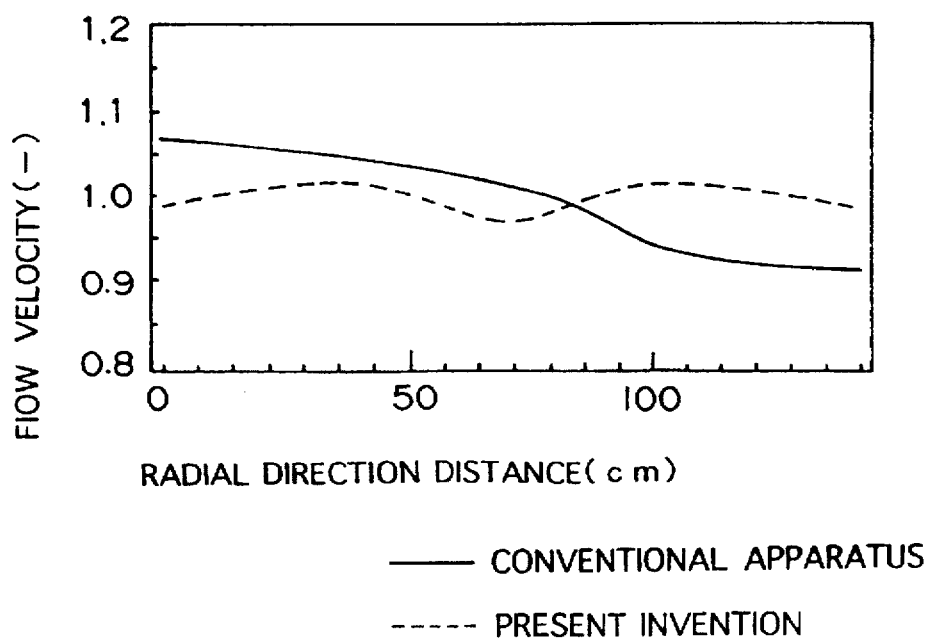
FIG. 16 is a graph of a rate of flow showing an effect on the embodiment.

Graphs of confirming effect of the present invention are illustrated in FIGS. 15 and 16.

FIG. 15 shows a relationship between the feeding density (g/cc) a position (radial direction distance: cm) from the center of the reaction tank 10 when the catalyst is fed in the reaction tank of 1.6 m in radius with the conventional instance and the embodiment of the present invention, and shows an example in which a falling distance of the catalyst, or the height from the apparatus to the sedimentary catalyst surface is defined as 1 m (100 cm) and 2 m (200 cm) in the present invention.

Compared with the conventional apparatus, in the present invention, it can be understood that uniform feeding density is obtained in both cases, 1 m and 2 m, of the falling distance according to FIG. 15.

FIG. 16 shows an example computed for the position (radial direction distance: cm) from the center of the reaction tank 10 when the catalyst is fed in the reaction tank of 1.6 m in radius with the conventional instance and the embodiment and each distribution of flow velocity when the average flow velocity is defined as 1.0.

Compared with the conventional instance in which the flow velocity in the radial direction has been changed in limits between about 0.9 and 1.07, in the present invention, it can be understood that since the flow velocity is changed in limits between 0.97 and 1.02, the stable flow of gas-liquid inside the reaction tank would be expected according to FIG. 16.

[SECOND EMBODIMENT]

Figure 17:
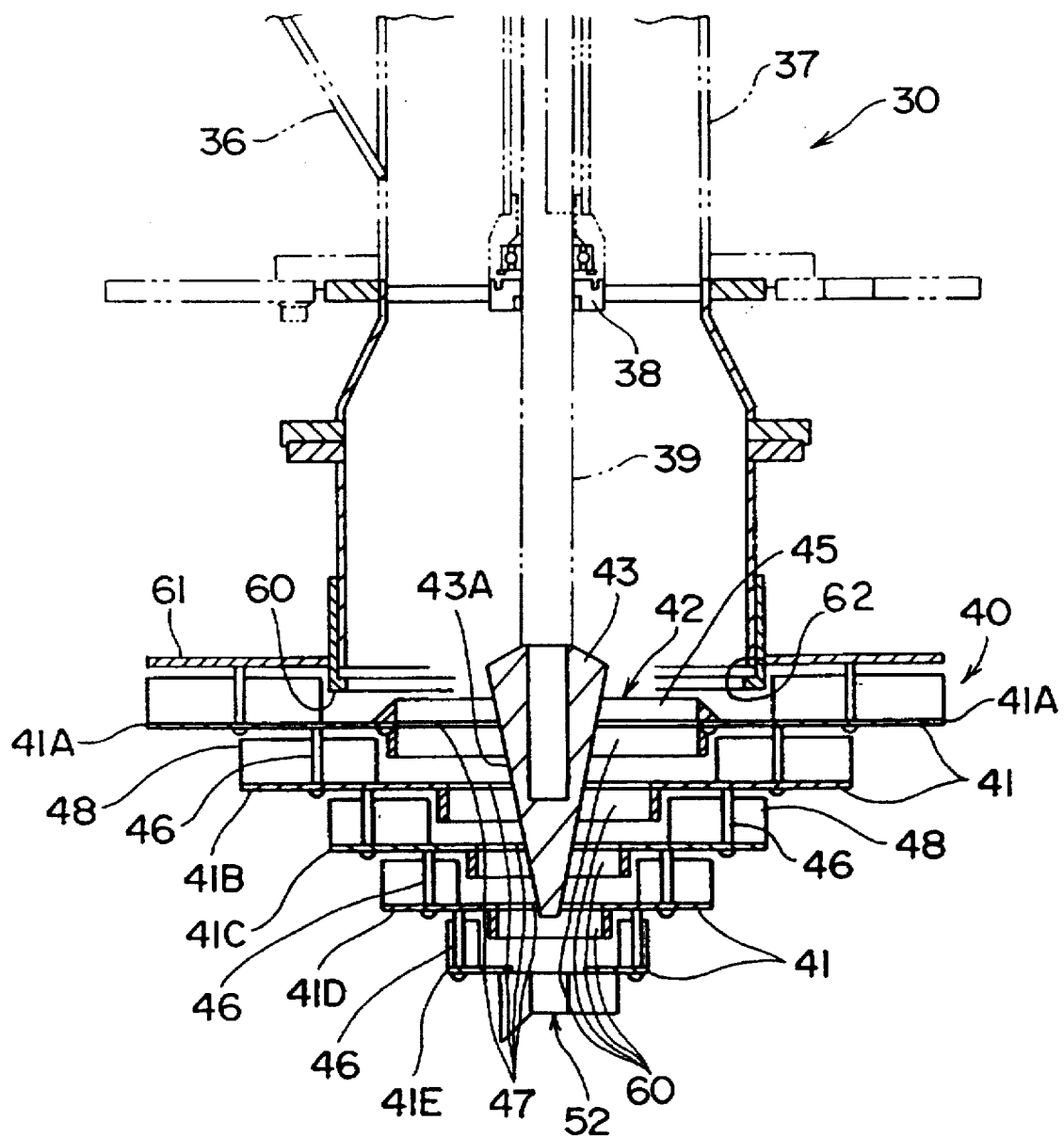
FIG. 17 is a diagram corresponding to FIG. 2 showing the second embodiment according to the present invention.

FIG. 17 shows a second embodiment according to the present invention. The embodiment adds a throttle plate throttling the flow of the catalyst 11 sent to each stage of the sprinkle rotor to the sprinkle rotor system 40 in the aforementioned first embodiment.

More specifically, in FIG. 17, around the central hole 47 of the sprinkle rotors 41A to 41D, there are ring throttle plates having side walls extending downward. The throttle plates 60 are adapted to throttle the flow of the catalyst sent to each below the sprinkle rotor.

On the top face of the uppermost sprinkle rotor 41A, there is an upper holding plate 61 having a doughnut type shape. On the center of the upper holding plate, a hole 62 is provided to engage with the bottom of the guide cylinder 37 included in the catalyst releasing device 30. And, the throttle plate throttling the flow of the catalyst sent to the uppermost sprinkle rotor 41A is provided around the hole 62 in the upper holding plate 61.

Incidentally, it is needless to provide the throttle plate 60 under the lowermost sprinkle rotor 41E, because the sprinkle rotor 41 is not provided under the lowermost sprinkle rotor 41E any more.

In the embodiment, the catalyst having the easily rolled shape is employed. Therefore, considering the rolling effect of the catalyst after settling down, the feeding period is defined to be shorter and shorter accordingly as the rotation frequency moves to the side of the minimum rotation frequency in order that the released catalyst is uniformly sprinkled in the whole rotation frequency from the maximum rotation frequency to the minimum rotation frequency.

TABLE 8 shows a rate of the feeding period in other rotation frequencies when the feeding period in the minimum rotation frequency Nmin is defined as 1.

TABLE 8

The periodical pattern of the rotation frequency (case of the five stages)

| Rotation frequency [rpm] | settling position of average length catalyst particle [cm] | Feeding period [—] |
|---|---|---|
| 167 (=Nmax) | 200 | 1.22 |
| 162 | 195 | 1.19 |
| 156 | 190 | 1.15 |
| 151 | 185 | 1.12 |
| 146 | 180 | 1.09 |
| 141 | 175 | 1.06 |
| 136 | 170 | 1.03 |
| 131 (=Nmin) | 165 | 1 (assumption) |

In the aforementioned embodiment, the effect and action as obtained in the first embodiment can be obtained, and further, considering the rolling effect of the catalyst after settling down, against the feeding period in the maximum rotation frequency Nmax, the feeding period in the side of the minimum rotation frequency Nmin is defined to become shorter and shorter accordingly as the rotation frequency moves to the side of the minimum rotation frequency Nmin, so that the catalyst 11 does not cluster on the outside although the catalyst 11 rolls easily. Therefore, the effect which the catalyst released from each sprinkle rotor 41 can be uniformly sprinkled can be obtained.

It is to be understood that the present invention is not intended to be limited to each above-described embodiment, and various changes or the like as shown below are included in the scope of the present invention without departing from the spirit of the present invention.

Each measure and stage number of the catalyst releasing device 30, in particular, of the sprinkle rotor system 41 are not limited to each measure and stage number in the aforesaid embodiments, and which measure and stage number may be changed in response to various conditions such as the shape of the reaction tank, type and particle size of the catalyst, the sprinkling rotation number or the sprinkled catalyst quantity, and should be suitably decided under each condition.

Intervals of changing the rotation frequency are changed under every condition, which the feeding period of the side of the minimum rotation frequency may not be needed to differ from the feeding period of the side of the maximum rotation frequency. However when the feeding period of the side of the minimum rotation frequency differs from the feeding period of the side of the maximum rotation frequency, the effects as described in the embodiments can be obtained.

Structure of other parts such as the suspender winding system 23, hopper system 25, hose winding system 27 and control means 70 of the catalyst feeding apparatus 20 may be suitably selected in effecting.

For example, the catalyst releasing device 30 is not limited to have the supporting arm 36 and is not intended to be supported by another structure. The shape of the partitive member 48, guide member 52 and so on may be optionally selected.

What is claimed is:

1. A method of feeding a catalyst inside a reaction tank by sprinkling with the catalyst from a catalyst releasing device while rotating a sprinkle rotor of the catalyst releasing device hung inside the reaction tank, comprising the steps of:

defining and maintaining a height from the fed catalyst surface to the catalyst releasing device in the reaction tank selecting a rotation frequency of the catalyst releasing device so that the catalyst which lands onto the fed catalyst surface has a speed constituent Ux>0 in a radial direction of the reaction tank when the catalyst is released from the catalyst releasing device at an initial speed; and periodically changing the rotation frequency of the catalyst releasing device to maintain a uniform fed catalyst surface while feeding the catalyst into the reaction tank.

2. The method of feeding the catalyst according to claim 1, further comprising the steps of:

defining the releasing height of the catalyst releasing device as over 0.5 m from the fed catalyst surface inside the reaction tank; and defining the initial speed of the catalyst released from the catalyst releasing device as generally 1.5 m/sec.

3. The method of feeding the catalyst according to claim 1, further comprising the steps of:

extending plural partitive members on a disk rotor of the sprinkle rotor in a radial direction from an axis of rotation of the catalyst releasing device and spacing the plural partitive members from each other, orienting the multistage disks at a predetermined distance from one another in a vertical direction, orienting the multistage disks of the sprinkle rotors so that the lower stage has a smaller diameter than the adjacent upper stage;

cycling the rotation frequency of the sprinkle rotor within a cycle range between a maximum value and a minimum value, and defining the maximum and minimum values to create a first annular position where the catalyst, released from an upper sprinkle rotor of the lengthwise adjacent sprinkle rotors, settles down when operating at a minimum rotation frequency and a second annular position where the catalyst, released from the lower sprinkle rotor, settles down when operating at a maximum rotation frequency, the second annular position being contiguously adjacent the first annular position in order to consecutively feed the reaction tank with catalyst released from the respective sprinkle rotors to the respective annular first and second positions contacting lengthwise with one another in a radial direction of the reaction tank.

4. The method of feeding the catalyst according to claim 1, further comprising the steps of determining the limits of a rise of the catalyst within the reaction tank with the catalyst releasing device, and increasing the rotation frequency of the catalyst releasing device to effect a sequential covering of an entire sprinkling area with the catalyst.

5. An apparatus for feeding a catalyst, comprising:

plural disk sprinkle rotors each having plural partitive members extending in a radial direction to an axis of rotation spaced at a predetermined distance from one another, the plural disk sprinkle rotors being oriented as multistage disks in a predetermined distance from one another in a vertical direction;

a catalyst releasing device including a rotation driving system for driving rotatably the sprinkle rotors;

a pendant system hanging the catalyst releasing device inside a reaction tank and capable of adjusting the height of the catalyst releasing device within the reaction tank; and a control means for controlling rotation frequency of the catalyst releasing device, the control means controlling the rotation driving system of the catalyst releasing device to periodically and cyclically change the rotational frequency of the sprinkle rotors in the catalyst releasing device between a predetermined maximum rotation frequency and minimum rotation frequency during feeding of the catalyst onto a fed catalyst surface in the reaction tank, the maximum rotation frequency being defined as a rotation frequency causing the catalyst, released from the uppermost sprinkle rotor of the plural sprinkle rotors in the catalyst releasing device, to fall down around bottom inner wall of the reaction tank, and the minimum rotation frequency being defined as a rotation frequency causing the catalyst, released from the uppermost sprinkle rotor, to fall down to substantially the same position as where the catalyst released from a second sprinkle rotor positioned just under the uppermost sprinkle rotor falls down to when the sprinkle rotor is rotated at the maximum rotation frequency, and a diameter of each sprinkle rotor being defined so as to cause a first position where the catalyst, released from the lower sprinkle rotor of the lengthwise adjacent sprinkle rotors, settles down when the lower sprinkle rotor rotates at the maximum rotation frequency and a second position where the catalyst, released from the upper sprinkle rotor of the lengthwise adjacent sprinkle rotors, settles down when the upper sprinkle rotor rotates at the minimum rotation frequency, said first and second positions being generally equal to one another.

6. The apparatus for feeding the catalyst according to claim 5, wherein the control means includes means for controlling the difference between a period of changing from the maximum rotation frequency to a regular rotation frequency of the rotation frequency and another period of changing from the regular rotation frequency to the minimum rotation frequency so as to uniformly sprinkle the catalyst released from each sprinkle rotor throughout a corresponding area of the fed catalyst surface at the rotation frequency between the maximum rotation frequency and the minimum rotation frequency of the sprinkle rotors.

7. The apparatus for feeding the catalyst according to claim 6, wherein the control means additionally controls, against the feeding period at the maximum rotation frequency, the feeding period at the minimum rotation frequency such that the feeding period at the minimum rotational frequency becomes longer and longer accordingly as the rotation frequency moves closer to the minimum rotation frequency so as to sprinkle the catalyst uniformly with the catalyst released from each sprinkle rotor at each rotation frequency between the maximum rotation frequency and the minimum rotation frequency.

8. The apparatus for feeding the catalyst according to claim 6, wherein the control means additionally controls the feeding period at the minimum rotation frequency to become shorter and shorter accordingly as the rotation frequency changes to the minimum rotation frequency when the control means corrects for a rolling effect of the catalyst after the catalyst contacts the fed catalyst surface so as to sprinkle uniformly with the catalyst released from each sprinkle rotor into a corresponding area at each level of the rotation frequency between the maximum rotation frequency and the minimum rotation frequency of the sprinkle rotors.

9. The apparatus for feeding the catalyst according to claim 5, wherein the rotation driving system is provided to rotatably drive the catalyst releasing device, the rotation driving system being adapted to rotatably drive the catalyst releasing device in both a clockwise direction and a counter-clockwise direction.

10. The apparatus for feeding the catalyst according to claim 5, wherein the catalyst releasing device is positioned at the center of the reaction tank by supporting arms having an expansion system of a pantagraph type.

11. The apparatus for feeding the catalyst according to claim 5, wherein each sprinkle rotor has a coaxial hole opened at the center of each sprinkle rotor for flowing the catalyst therethrough, the coaxial holes becoming smaller as the diameter of the sprinkle rotors become smaller and feeds each sprinkle rotor with the catalyst.

12. The apparatus for feeding the catalyst according to claim 11, wherein the sprinkle rotor arranged at the lowermost stage of the catalyst releasing device includes a guide member thereunder to sprinkle the catalyst at center of the reaction tank and outside the center in concentric circles adjacent the center.

13. The apparatus for feeding the catalyst according to claim 12, wherein the hole opened at the center of the sprinkle rotor arranged at the lowermost stage of the catalyst releasing device is an ellipse.

14. The apparatus for feeding the catalyst according to claim 13, wherein the sprinkle rotor has movably adjusted plates adjusting an open area of the ellipse under the lowermost stage of the catalyst releasing device.

15. The apparatus for feeding the catalyst according to claim 11, further comprising throttle plates positioned around the hole opened at the center of each sprinkle rotor, each throttle plate having side walls extending downwardly toward the adjacent smaller sprinkle rotor.

16. The apparatus for feeding the catalyst according to claim 15, further comprising a holding plate having almost the same diameter as the uppermost sprinkle rotor arranged on the uppermost stage of the catalyst releasing device, the holding plate having a hole opened at the center thereof coaxial with the coaxial holes opened at the center of each sprinkle rotor and providing a throttle plate having the side walls extending downwardly toward the uppermost sprinkle rotor around the hole of the holding plate.

17. The apparatus for feeding the catalyst according to claim 5, wherein each sprinkle rotor has partitive members extending in a radial direction on a top surface of each sprinkle rotor.

18. The apparatus for feeding the catalyst according to claim 5, wherein the catalyst releasing device is connected with a hose feeding with the catalyst, the hose being composed of plural segments along the longitudinal direction of the hose to be rolled up the separated segments by a hose winding system provided thereon and the separated segments including connecting zippers to connect among the separated segments of the hose lifted down from the hose winding system.

19. The apparatus for feeding the catalyst according to claim 18, wherein the hose winding system includes an air-motor generating a predetermined rotation driving force, the air-motor capable of rotating in the opposite direction when being added in a larger rotating force in the opposite direction than the rotation driving force.

* * * * *